(12) United States Patent
Emigh et al.

(10) Patent No.: US 8,090,383 B1
(45) Date of Patent: Jan. 3, 2012

(54) METHOD AND SYSTEM FOR CHARGING FOR A SERVICE BASED ON TIME SPENT AT A FACILITY

(76) Inventors: Aaron T. Emigh, Incline Village, NV (US); James A. Roskind, Redwood City, CA (US)

(*) Notice: Subject to any disclaimer, the term of this patent is extended or adjusted under 35 U.S.C. 154(b) by 492 days.

(21) Appl. No.: 11/061,498

(22) Filed: Feb. 17, 2005

Related U.S. Application Data

(60) Provisional application No. 60/545,575, filed on Feb. 17, 2004.

(51) Int. Cl.
*H04W 24/00* (2009.01)
(52) U.S. Cl. ........... 455/456.1; 455/406; 340/932.2
(58) Field of Classification Search ........... 455/33.1, 455/53.1, 54.1, 56.1, 428, 406–408
See application file for complete search history.

(56) References Cited

U.S. PATENT DOCUMENTS

| | | | | |
|---|---|---|---|---|
| 6,087,965 A * | 7/2000 | Murphy | ........ | 340/991 |
| 6,340,935 B1 * | 1/2002 | Hall | ........ | 340/932.2 |
| 6,718,263 B1 * | 4/2004 | Glass et al. | ........ | 701/213 |
| 6,836,653 B1 * | 12/2004 | Kang | ........ | 455/408 |
| 6,915,135 B1 * | 7/2005 | McKee et al. | ........ | 455/456.6 |
| 6,993,319 B2 * | 1/2006 | Himmel et al. | ........ | 455/406 |
| 7,023,995 B2 * | 4/2006 | Olsson | ........ | 380/258 |
| 7,065,446 B2 * | 6/2006 | Chou | ........ | 701/207 |

* cited by examiner

*Primary Examiner* — Vladimir Magloire

(57) ABSTRACT

In some embodiments, techniques for location-based services may comprise receiving a first report associated with a mobile phone and with entering a facility, receiving a second report associated with the mobile phone and with exiting the facility, and determining an amount of time during which the mobile phone was associated with the facility based at least in part on data including information relating to a first time associated with the first report and a second time associated with the second report, wherein the amount of time is to be used in calculating a charge on an invoice to a client associated with the facility for a service performed by personnel associated with the mobile phone.

48 Claims, 12 Drawing Sheets

METHOD AND SYSTEM FOR CHARGING FOR A SERVICE BASED ON TIME SPENT AT A FACILITY

CROSS REFERENCE TO RELATED APPLICATIONS

This application claims priority to U.S. Provisional Patent Application No. 60/545,575 entitled Location-Aware Monitoring, Billing and Auditing, filed Feb. 17, 2004, which is incorporated herein by reference for all purposes.

FIELD OF THE INVENTION

The present invention relates generally to the area of computer software and portable electronics, more specifically to the area of location-aware devices.

BACKGROUND OF THE INVENTION

Technology for determining location has become small and inexpensive, facilitating the creation of location-aware devices. Many businesses need to keep track of objects such as materiel or personnel. Current ways to keep track of objects do not readily facilitate billing, auditing, compliance, maintenance or prevention of misuse or theft.

It would be useful to have increased functionality related to location-aware devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
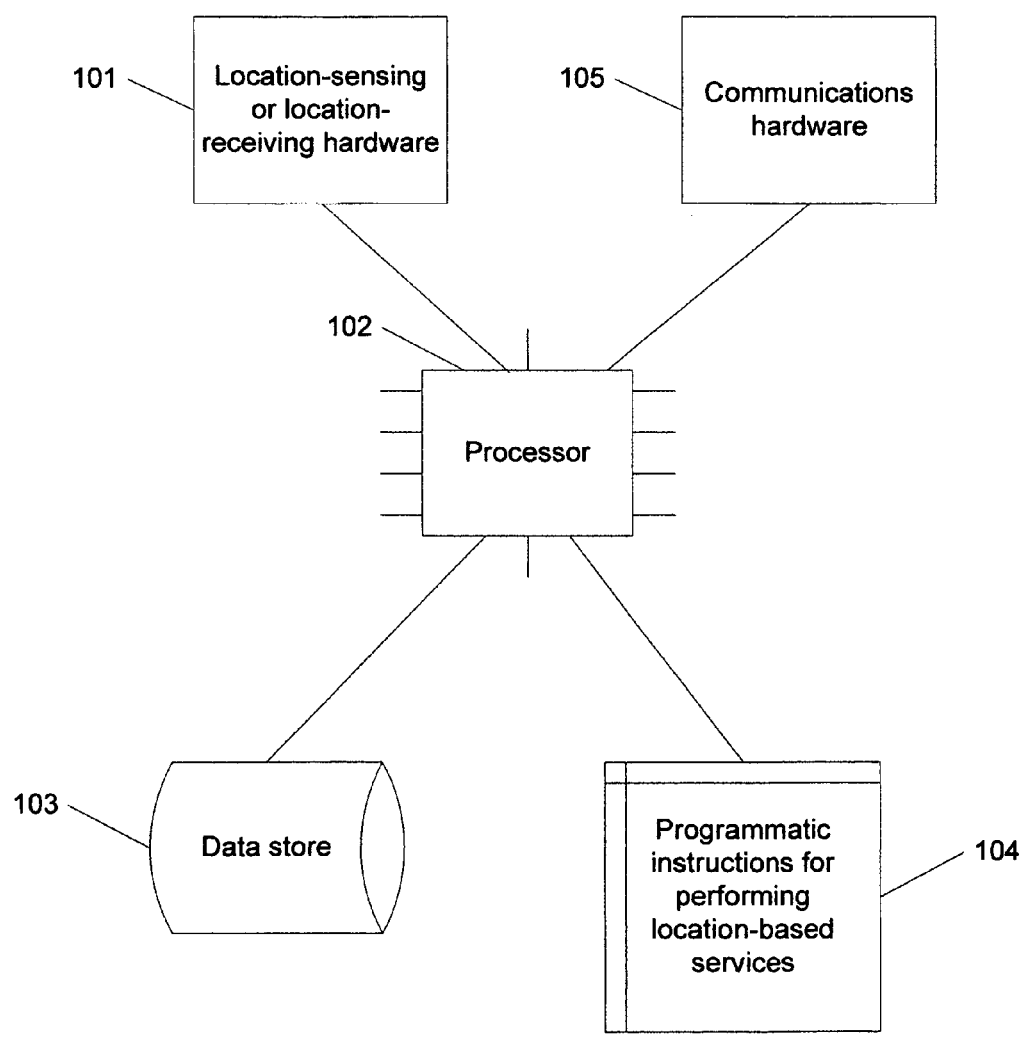
FIG. 1 is a diagram of a system for location aware services, according to some embodiments.

FIG. 1 is a diagram of a system for location aware services, according to some embodiments. In this example, location sensing and/or location receiving hardware 101 is connected to a processor 102. An example of location receiving hardware is a local transmission receiver, such as a Bluetooth, RFID, or 802.11x receiver. Examples of location sensing hardware include a GPS (Global Positioning System) satellite receiver, an accelerometer, an odometer, a camera, a light sensor, and a physical motion sensor such as a switch, micro switch, or magnetic reed switch. Examples of a processor include an embedded microprocessor, a general purpose microprocessor, and a mainframe processor.

A data store 103 may be connected to a processor 102. Examples of a data store include electronic, magnetic, optical, or physical storage devices. Respective examples include memory such as DRAM (dynamic random access memory), SRAM and/or flash memory, a magnetic disk storage device, an optical CD or DVD, and physical printed paper.

Programmatic instructions for performing location-based services 104 are provided to the processor. Examples of such instructions include computer programs for deciphering location related receptions, organizing location information, correlating location information, recording location information, and notifying entities of results.

Communications hardware 105 may be connected to a processor 102. Examples of communications hardware include transmitters and receivers. Examples of transmitters and/or receivers include RFID tags, RFID sensors, and network interfaces, as well as passive transmitters, such as reflectors.

In some embodiments, a receiver may determine the presence of a signal, receive data, and also determine that a transmitter is no longer providing a signal. For example, a transmitter may fail to provide a signal because it is no longer within range, it is no longer operational, or the communications path has been interrupted.

In some embodiments, receivers may acquire location information from other nearby devices, for example using 802.11 or Bluetooth. In some embodiments, transmitters may provide location information to other nearby devices. An example of a format for exchange of location information is the National Marine Electronics Association standard NMEA-0183.

In some embodiments, a transmitter may make its presence known to one or more sensors. Examples of transmitters include a simple identification tag such as RFID, a cell phone, and a device such as a wireless-enabled PDA that communicates over a wireless protocol, for example Bluetooth, 802.11x, or a cellular network. In some embodiments, receivers may record and/or respond to the presence of detected transmissions. For example, a response to a detected transmission may include responding to the transmitter with location information, or communicating with another entity, such as a central service, that a device, device type, or specific device ID, has been detected.

Figure 2:
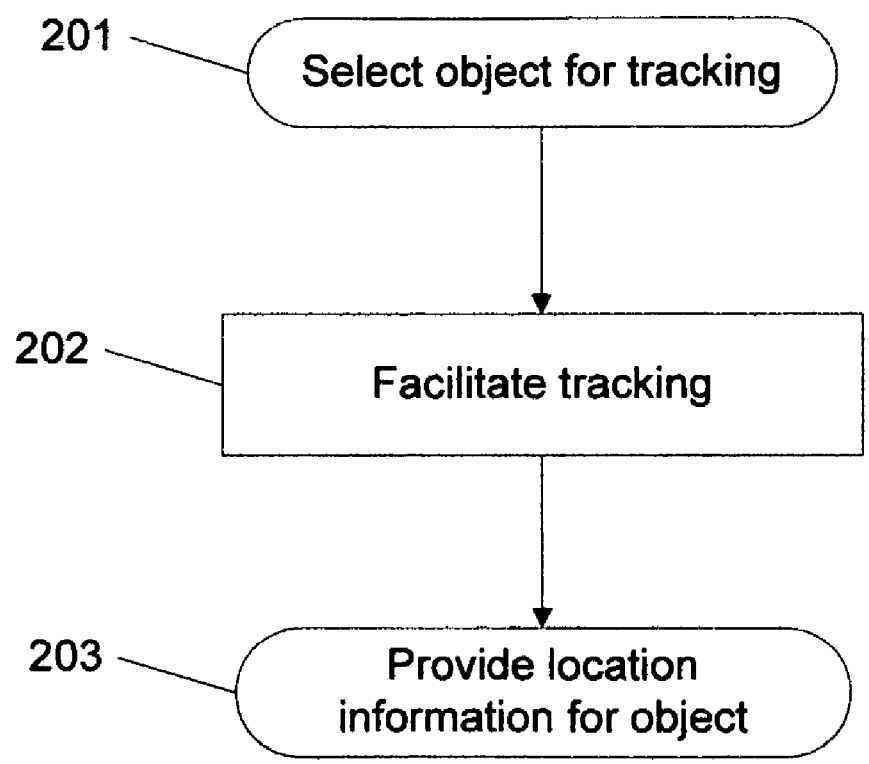
FIG. 2 is a flow diagram of a method for preparing for location-based tracking, according to some embodiments.

FIG. 2 is a flow diagram of a method for preparing for location-based tracking, according to some embodiments. In this example, an object may be selected for tracking (201). In some embodiments, personnel may be selected. In some embodiments, materiel may be selected. Examples of personnel include employees, contractors, subcontractors, suppliers, visitors, and agents. Examples of materiel include materials, vehicles and equipment.

Tracking may be facilitated (202). For example, location information for tracking may be provided by any device that can be aware of its location or for which a location may be determined, herein referred to as a Location-Aware Device (LAD). In some embodiments, facilitating of tracking may consist of physically associating a LAD with an object, for example by attaching a LAD to an object, or by requiring that a LAD remains near an object. For example, a person may be required to carry a specific LAD. In some embodiments, facilitating of tracking may include recording an association of an object with a LAD, for example by establishing or retrieving an object identifier associated with the object and recording that the object associated with the identifier is expected to be at a location that is substantially similar to a specific LAD. In this example, an object identifier may be any identifier associated with an object, for example a unique numeric identifier generated in a sequence such as a sequence of sequential integers and associated with an object in a data store such as a database.

Examples of LADs include a personal digital assistant (PDA) that has the capability to receive communications from Global Positioning System (GPS) satellites (for example, an HP iPaq 5555 with a Pharos PF022 card, a Handspring Visor with a Magellan GPS Companion module, or a Garmin iQue 3600), a factory-installed automotive unit such as a Siemens IDIS or TetraStar (as used in BMW and Mercedes automobiles), a cellular telephone capable of receiving location information from one or more transmission cells within transmitting range, or any other type of device that can be aware of its location either directly or indirectly. Examples of ways in which a LAD may be made aware of its location include the use of one or more of the following: satellite-based services such as GPS, accelerometers, speedometers, odometers, gyroscopes, local transmissions from fixed or mobile locations, and by connecting with another LAD and receiving location information from it.

In some embodiments, a device that has no internal way to divine its location may be made location-aware by communication with other nearby devices. An example of such communications is the use of a communications network, for example, using 802.11 or Bluetooth. In some embodiments, a LAD may make location information available, for example via the National Marine Electronics Association standard NMEA-0183.

In some embodiments, a LAD may include a transmitter that makes its presence known to one or more sensors, which may inform a device (for example, the transmitting device) of its location, and/or may record the presence of the transmitter. Such a transmitter may include any device that can make itself known. Examples of transmitters include a simple identification tag such as RFID, a cell phone, and a device such as a wireless-enabled PDA that communicates over a wireless protocol, for example Bluetooth, 802.11x, or a cellular network.

In some embodiments, a LAD may include a passive transmitter, such as a reflector. For example, a location may be observing by reflected light with video cameras at known locations and tracking a selected object.

Location information may be provided for an object (203). For example, location information may be transmitted for external use and processing, including tracking an object, as discussed in conjunction with FIG. 3. Examples of methods for transmission of location information may include the use of a network, such as an 802.11 network or a cell phone network, or may involve storage of location information, and opportunistic transmission of such information when connectivity is established, for example when a device is physically connected to a recipient or in sufficient physical proximity of a recipient or a network capable of transmitting to a recipient. As another example, location information may be used internally by a LAD, including logging or recording for future use, as well as use for determination of presence in a defined logical location, such as discussed in conjunction with FIG. 11.

In some embodiments, location information may be provided on an ongoing basis. For example, location information may be provided at fixed intervals of time, such as every second, or may be provided after movement in excess of a threshold, such as movement beyond a fixed distance from a last transmission, or movement that is not within a fixed distance of a predicted location based on previous transmissions. For example, a location may be predicted by assuming an object is moving with constant velocity, as established by two previous location transmissions, and location information may be transmitted when the deviation from continuation at the previous velocity is greater than a threshold. In some embodiments, location predictions may be made using velocity, acceleration, or higher order statistics, or a previously agreed trajectory, for example including an arbitrary path and associated timeline for motion on that path. In some embodiments, location information may be transmitted within a fixed interval of time from a last transmission. For example, a transmission may be regularly provided within 30 seconds of the last transmission, and an earlier transmission may be provided if a threshold of movement or deviation from a predicted location is exceeded.

Figure 3:
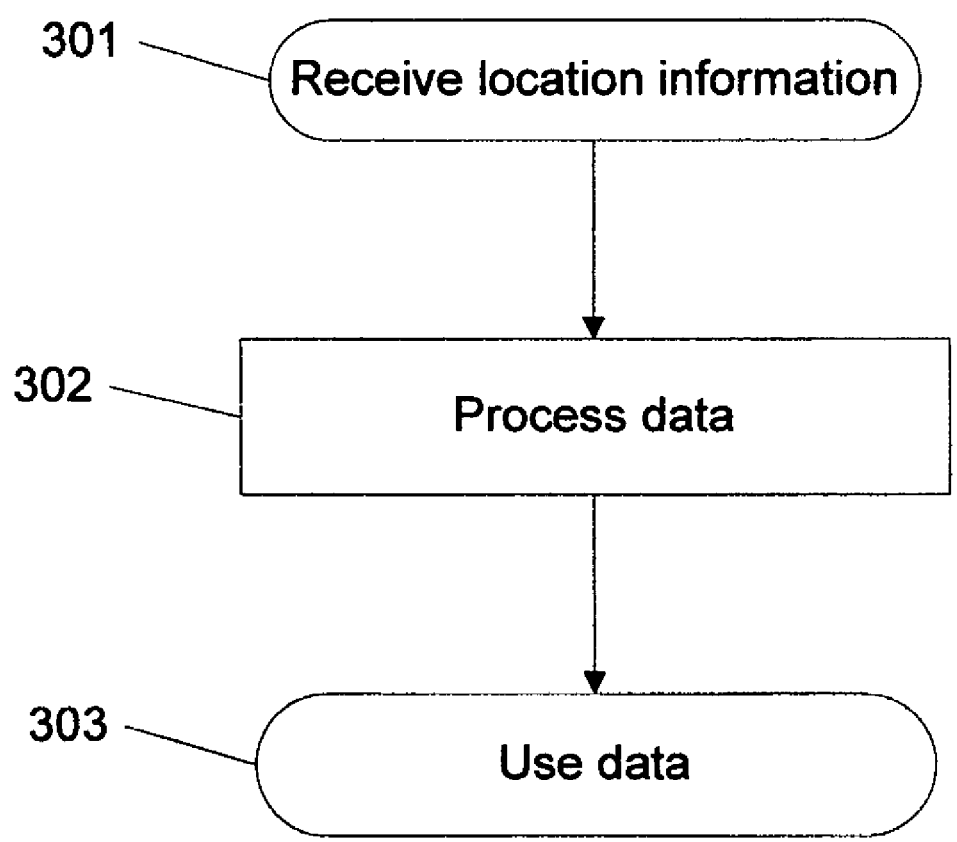
FIG. 3 is a flow diagram of a method for tracking an object, according to some embodiments.

FIG. 3 is a flow diagram of a method for tracking an object, according to some embodiments. In this example, location information may be received (301). For example, location information may be received from a LAD, for example as discussed in conjunction with FIG. 2, or certified location information may be received, for example as discussed in conjunction with FIG. 4.

In some embodiments, location information may include a location and an object identifier. An example of an object identifier is discussed in conjunction with 202 of FIG. 2. In some embodiments, a location may be provided, and an object identifier may be determined. Determination of an object identifier may for example use the object identifier that was nearest the provided location in previously received location information. For example, in passive monitoring using a video camera, a unique object identifier may be created for a moving object, such as a person, and that object identifier may be reused automatically for a moving object, such as the same person, in successive video frames based on a substantially similar location in consecutive frames.

In some embodiments, location information may be received at fixed time intervals. In some embodiments, location information may be received when significant changes in location have occurred.

In some embodiments, location information may be received at a central location, for example a computer server. In some embodiments, location information may be received at an intermediate location. In some embodiments, location information may be received from a transmission by an LAD, for example when a synchronization operation is performed, when an explicit request for location information is made, or on a regular schedule via a network connection, or opportunistically when a connection is available.

In some embodiments, location information determined by sensors and/or received from transmitters may be transmitted to and received by a central location. For example, such transmissions may be directly through a network connection (for example, via 802.11 infrastructure mode), indirectly through communication with one or more other devices that have network connections (for example, via peers in 802.11 ad hoc mode), or via a mobile device that is brought within transmitting range of a sensor or affiliated device.

In some embodiments, location information may be received from records of previously recorded information, for example by retrieving the information from logs or from a database.

Location information may be processed (302). In some embodiments, processing may include validating data, for example validating one or more cryptographic signatures received with location information. Such validation related information may, for example, have been created as discussed in conjunction with 402 of FIG. 4. In some embodiments, processing may include categorizing data, for example determining how the location relates to one or more logical locations, for example as discussed in conjunction with FIG. 5. Another example of categorization is discussed in conjunction with 1102 of FIG. 11. In some embodiments, processing data may include correlating information with previously received location information, for example creating aggregate information that specifies duration at a location or in a logical location, for example as discussed in conjunction with 1107 and 1108 of FIG. 11. In some embodiments, processing of data may include making the raw location information available for other uses.

The processed data may be used (303). In some embodiments, uses may include actions in support of billing, auditing, compliance, security, liability or safety. Examples include: billing as discussed in conjunction with FIG. 6; liability as discussed in conjunction with 12; auditing for compliance, security and safety as discussed in conjunction with FIG. 9; and policy compliance including security and safety as discussed in conjunction with FIG. 8.

In some embodiments, use of processed data may include recording some or all data, or providing some or all data to other recipients, for example by transmitting the data. In some embodiments, processed location information, such as the tracking of one or more objects, may be recorded. In some embodiments, tracking history of an object may be stored in a central location, for example in a database. In some embodiments, tracking history of an object may be stored in an object, for example in the LAD being tracked.

In some embodiments, location information for an object, including for example correlation with logical locations, may be recorded. An example of recording a correlation of an object with a logical location is to store an object identifier associated with the object, associated with the logical location and optionally a time and/or duration. In some embodiments, periods of time spent at or near predetermined logical locations may be recorded. For example, when one or more consecutive locations are determined to be within a logical location, the period between those reports may be assumed to have been in the logical location. As a second example, any period of time after a received location is inside a logical location and up to a percentage of the time until a received location is outside a logical location may be used as a determination that such percentage of the time the object was in the logical location. In this example, the percentage may be a fixed percentage, such as 50% or 100%. In some embodiments, the period of time inside a logical location may be smoothed. For example, the period of time may be quantified as a start time and an end time, rather than a longer series of consecutive times and location determinations. In some embodiments, smoothing may include merging the range of time a-b with the range c-d, when both ranges were determined to be within a logical location, and the duration outside the location, between times b and c, is less than some threshold, for example 1 minute. Such location information correlated to logical locations may be stored, for example in a database. Optionally, raw location data may also be retained, for example for use in a later audit.

Figure 4:
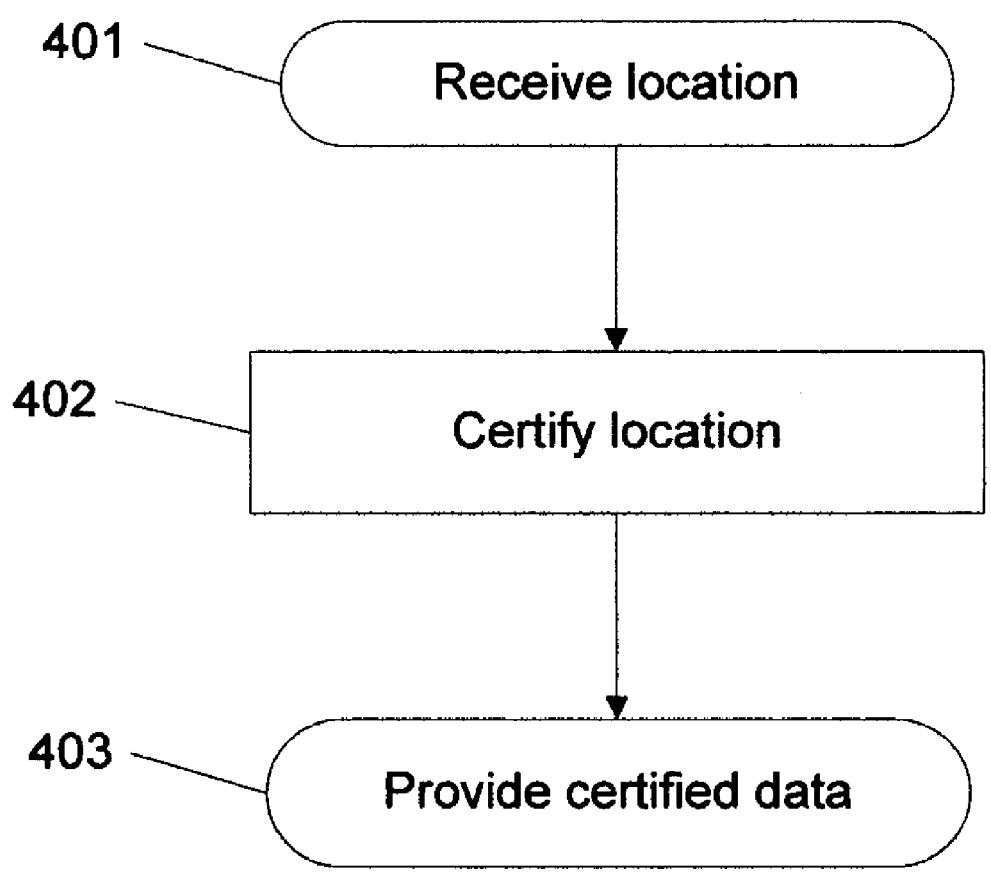
FIG. 4 is a flow diagram of a method for certifying a location, according to some embodiments.

FIG. 4 is a flow diagram of a method for certifying a location, according to some embodiments. In this example, a location may be received (401). For example, a device at a fixed location may detect the presence of a transmitter, for example as discussed in conjunction with FIG. 1. As another example, a LAD may determine its own location.

A location may be certified (402). In some embodiments, information that is certified may include one or more of: the time, a location, a location ID, a device ID, and a set of location coordinates. An example of a location ID is the identification of a device that is located in a known location. In some embodiments, a certification may include a signature on the certified information, such as a cryptographic signature. For example, a cryptographic signature may include the encryption of the certified information, or a cryptographic hash of the certified information. In some embodiments, encryption may include use of a private key corresponding to a published public key, or the use of a secret symmetric key that is also known to a device that validates such a certification.

The certified data may be provided (403). For example, the data may be transmitted for processing and use, as discussed in conjunction with FIG. 3. In some embodiments, certified data may be provided to the LAD. An example of proving certified data to an LAD is for an RFID device to receive certified data from a nearby device. In some embodiments, certified data may be provided by the LAD.

Figure 5:
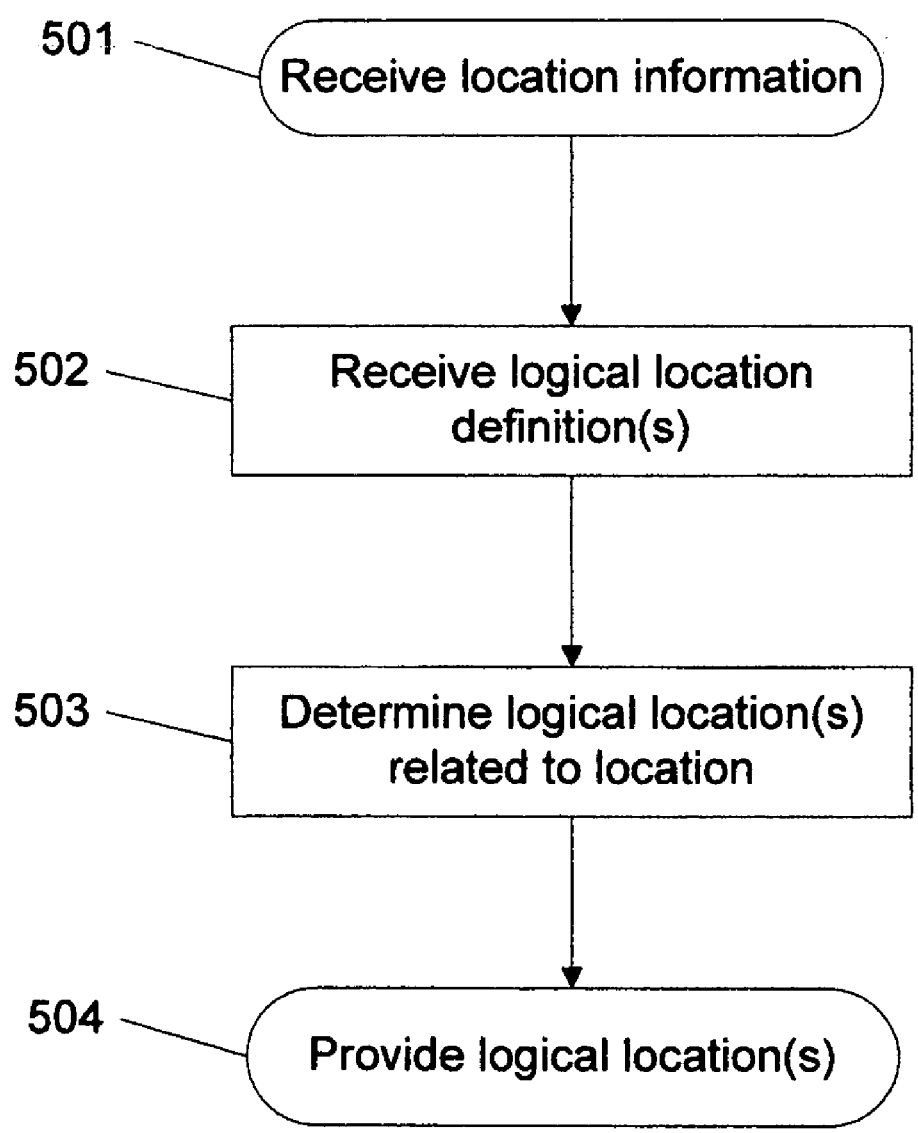
FIG. 5 is a flow diagram of a method for determining a presence in a defined logical location, according to some embodiments.

FIG. 5 is a flow diagram of a method for determining a presence in a defined logical location, according to some embodiments. In this example, location information is received (501). For example, received location information may be provided by a LAD, as discussed in conjunction with 203 of FIG. 2. In some embodiments, location information may be received in real-time or near-real-time, for example from a LAD. In some embodiments, stored location information may be retrieved.

One or more logical location definitions may be received (502). In some embodiments, a set of one or more predetermined logical locations may have been established, and those definitions may be retrieved from storage. A logical location refers herein to any group of one or more physical locations that may be logically grouped together into a single category, such as locations within one or more of a room, building, facility, campus, city, state, etc. An example of a logical location definition is a region, for example, as defined by two corner points on a rectangle or a rectangular solid. In some embodiments, a logical location may be defined to be bounded by a physical limitation, such as the reception range of a receiver or a transmitter. In some embodiments, a logical location definition may include a time specification. For example, a logical location may be defined to be within one geographic boundary during the hours of 9 am to 5 pm. In some embodiments, geographic boundaries of a logical location definition may have time varying elements. For example, a logical location may have one definition during the day, such as within a 20 miles of a car dealership, and another definition at night, such as within 1000 feet of the same car dealership.

It may be determined whether the received location is within one or more logical locations (503). Information regarding zero or more logical locations relating to the received location may be provided (504). For example, a list of one or more logical location definitions that contain the received location, or that exclude the received location, may be provided. In some embodiments, a time associated with the received location or the raw data associated with the received location may be provided. In some embodiments, providing information relating to logical location(s) may include transmitting the information, for example from a LAD to a server. In some embodiments, providing information relating to logical location(s) may include storing the information.

Figure 11:
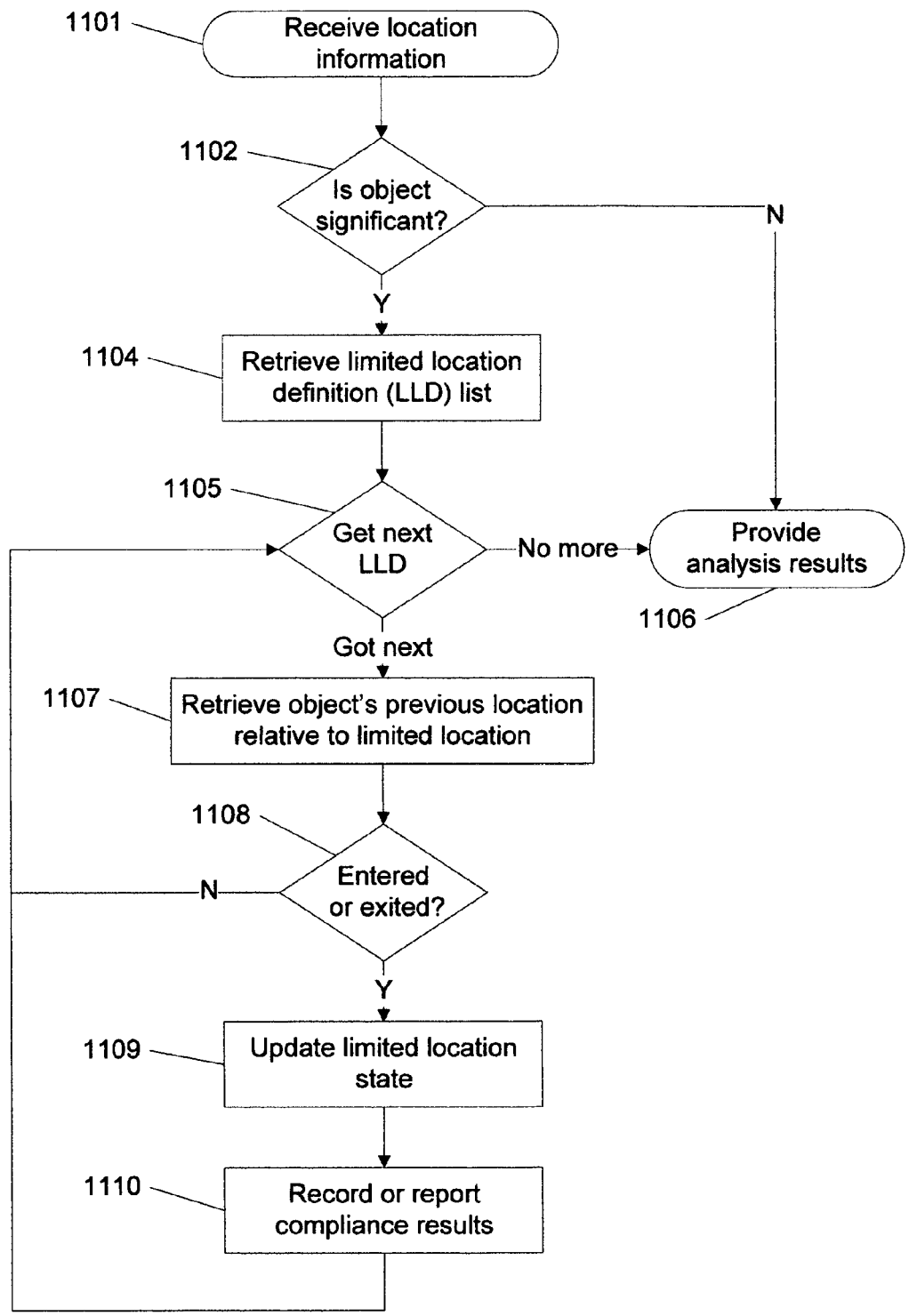
FIG. 11 is a flow diagram of a method for analyzing location information, according to some embodiments.

In some embodiments, logical location determination may be part of data processing 302 as discussed in conjunction with FIG. 3, and may use techniques discussed in conjunction with FIG. 11.

Figure 6:
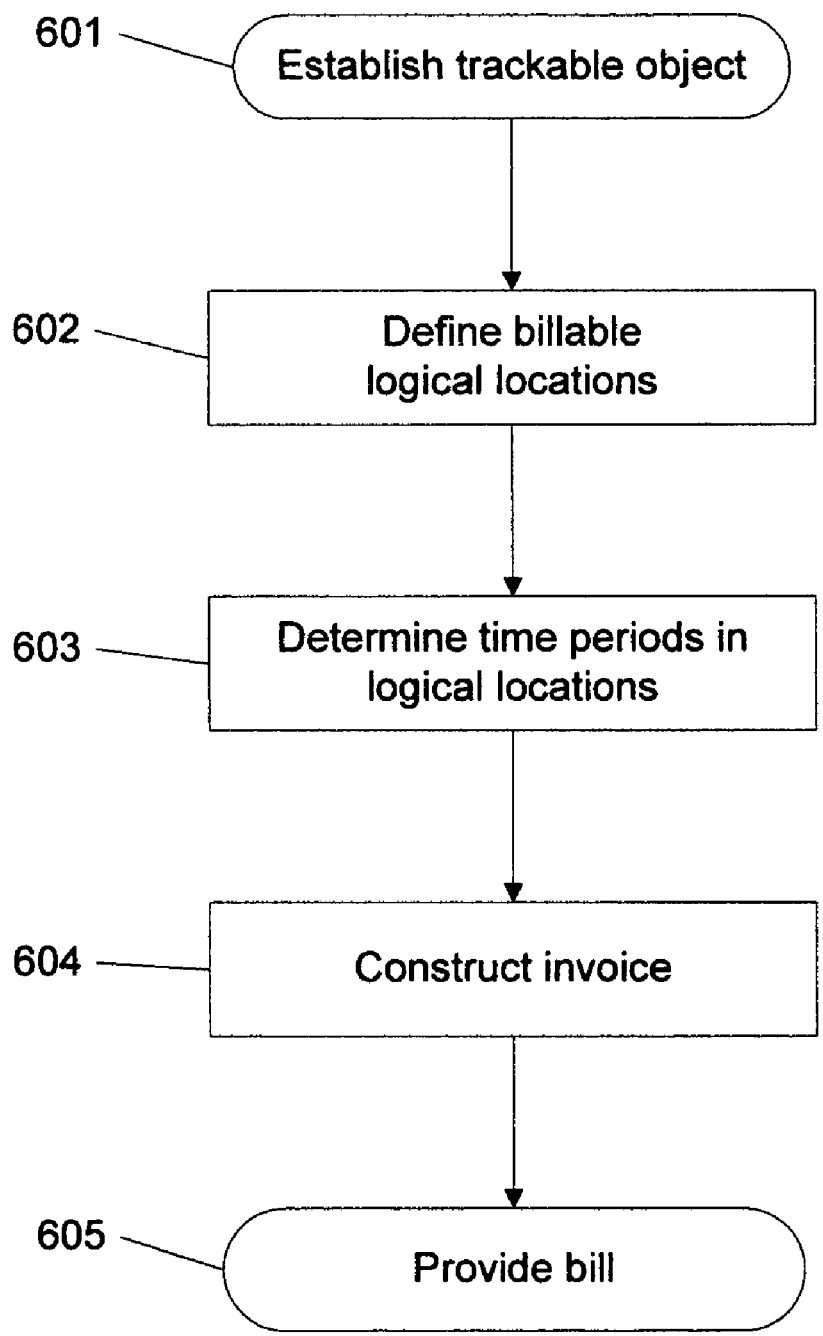
FIG. 6 is a flow diagram of a method for automatic billing, according to some embodiments.

FIG. 6 is a flow diagram of a method for automatic billing, according to some embodiments. In this example, a trackable object is established (601). For example, a trackable object may be personnel or material, such as a contractor or a piece of equipment. An example of establishing tracking is discussed in conjunction with FIG. 2.

A billable logical location definition may be established (602). In some embodiments, a billable logical location definition may include one or more logical location definitions. For example, one logical location definition may be associated with a customer's office, and a second logical location definition may be associated with a construction site, and the billable logical location definition may include presence in either of those defined logical locations. In some embodiments, a billable logical location definition may have specifications including a time of day. For example, presence near a construction site during daylight hours may be part of a definition of a logical location.

Time periods in a billable logical location may be determined (603). For example, methods similar to those discussed in conjunction with FIG. 11 may be used to determine presence in a logical location, either real-time or by analysis of a record of locations, and methods discussed in conjunction with FIG. 3 may be used to analyze and aggregate such periods, for example into a database or log.

An invoice may be constructed (604). For example, a customer may be charged a certain rate for particular contractor's time, and/or a certain rate for rental or use of certain equipment. In some embodiments, tracking data from one or more objects may be aggregated for invoicing, for example by transmitting logical location information to an accounting system and/or invoicing system. Such an accounting system and/or invoicing system may construct detailed invoices. For example, a contractor may be billed out at a rate of r dollars per hour, and tracking data may reveal that the contractor spent h hours at one or more logical locations associated with a customer C. In that example, an invoicing system may automatically add a line item charge for rh dollars to the invoice for C, and may optionally show details such as the specific time intervals that the contractor was present at C's job site(s).

An invoice may be provided (605). For example, an invoice may be transmitted or prepared for transmission, such as by being printed or formatted for electronic transmission. An example of formatting for electronic transmission is preparation of an XML-formatted invoice according to an invoice specification such as a Visa or PIDX XML invoice specification. In some embodiments, direct billing may be performed and optionally a fund transfer may be instigated, for example to pay for some or all of an invoice.

Figure 7:
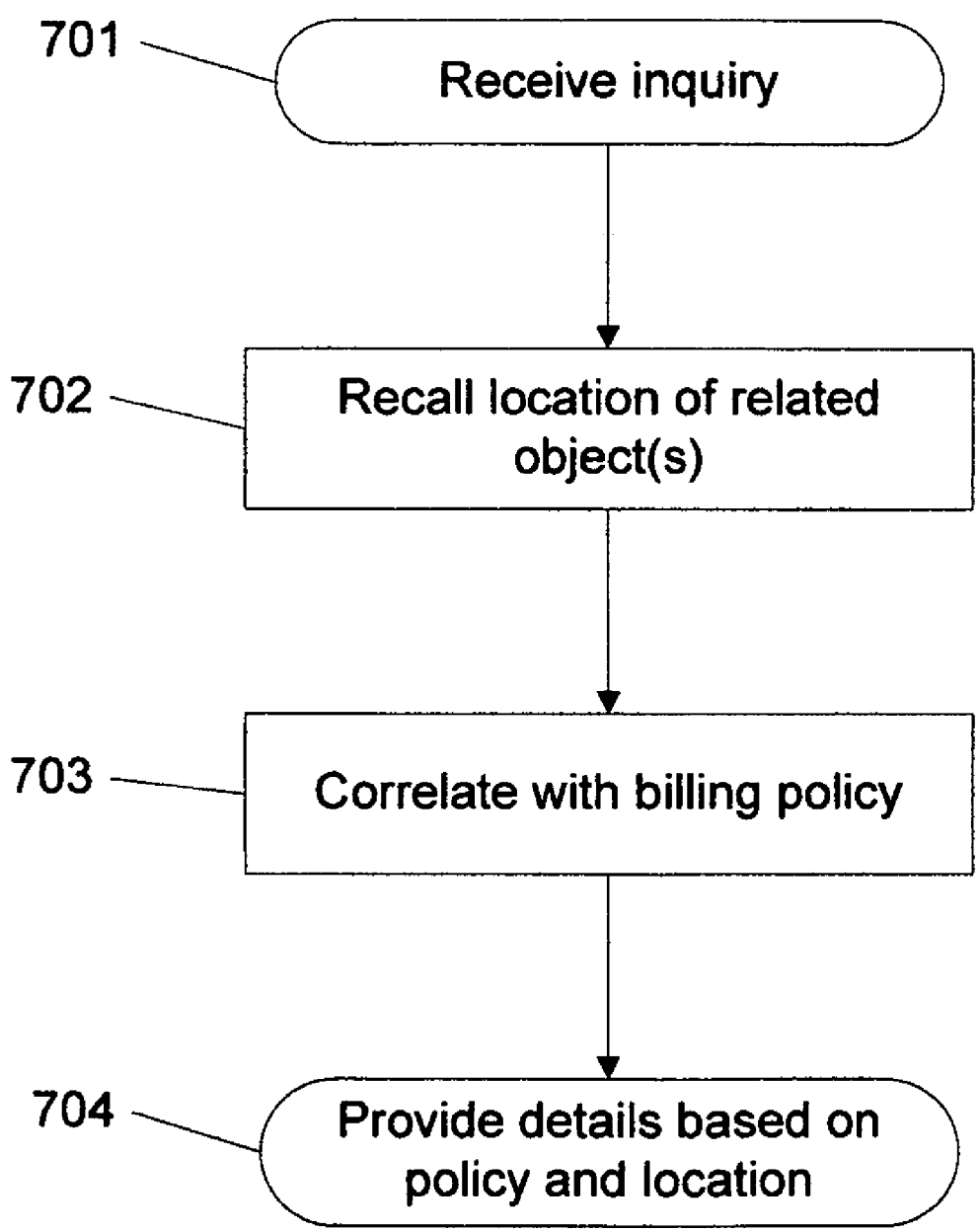
FIG. 7 is a flow diagram of a method for responding to a billing inquiry, according to some embodiments.

FIG. 7 is a flow diagram of a method for responding to a billing inquiry, according to some embodiments. In this example, an inquiry is received (701). For example, a customer or auditor may provide an inquiry about a line item on an invoice, such as discussed in conjunction with FIG. 6, including a request for details for a charge C and a particular contractor P on a particular day. In some embodiments, such inquiries may be used for customer support responses. In some embodiments, such inquiries may be used for internal audits and/or quality control purposes.

It may be determined what object(s) are associated with the inquiry, and location information associated with the object(s) may be recalled (702). For example, if a related object was a particular contractor P, or a particular piece of equipment M, then records, such as logs or database entries, may be searched for recorded locations at times just prior to, during, and just after the times in question.

Location information may be correlated with a billing policy (703). For example, the billing policy may indicate that a certain rate of charge is applicable when the object is in a certain billable logical location, and the location recalled may be determined to be within that billable logical location.

Details based on policy and location may be provided (704). In some embodiments, more detailed locations than included in an original invoice may be provided. For example, an original invoice may specify "work on site" as a reference to a specific billable logical location definition, and a recalled location may identify a precise area on site that the object passed through in the time interval in question, and that precise area designation may be used in the response to the inquiry. In some embodiments, more detailed times than included in the original invoice may be provided. For example, an original invoice may be created with a standardized rounding, for example rounding to the nearest half hour, and the recalled location information may include times that are precise to the nearest minute, and such more precise times may be used in the response to the inquiry.

Figure 8:
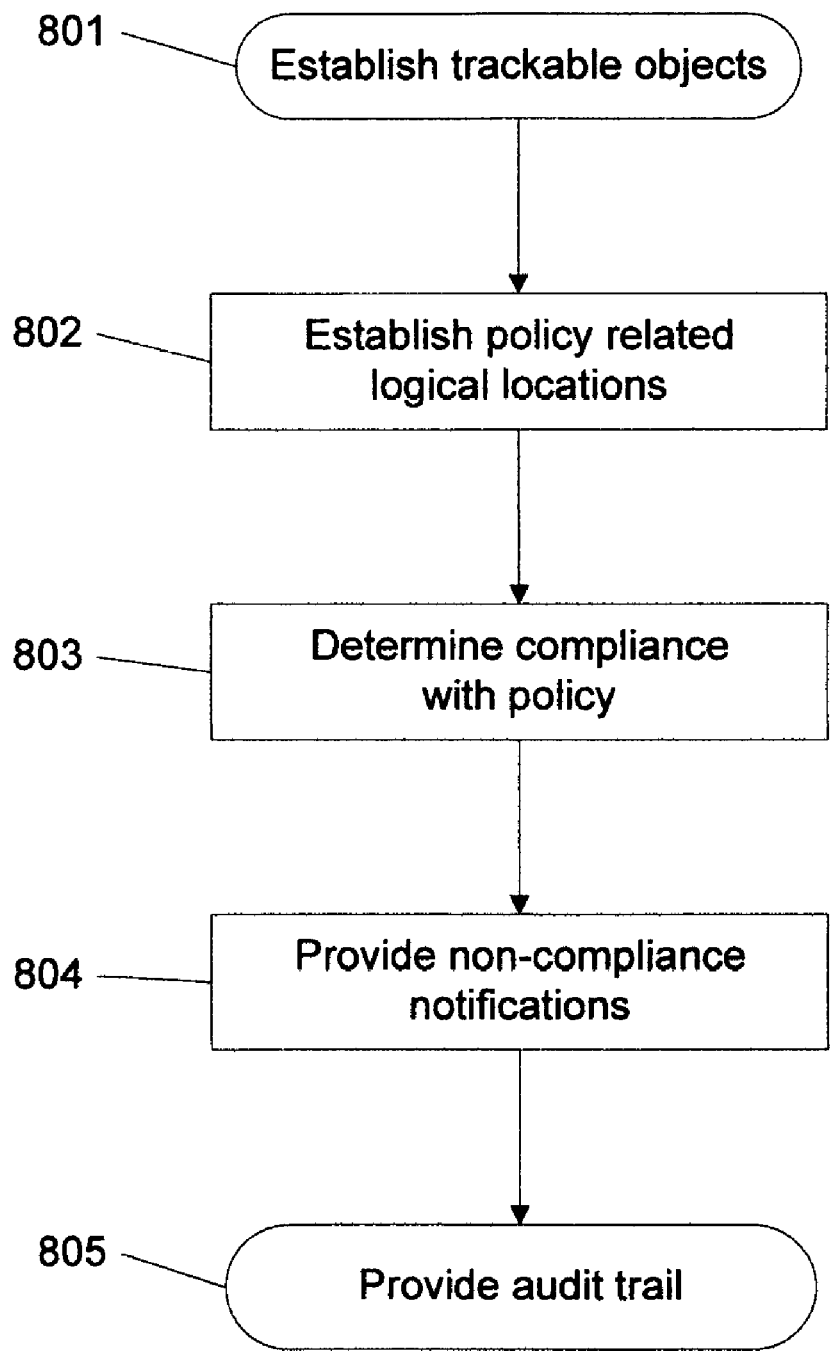
FIG. 8 is a flow diagram of a method for monitoring policy compliance, according to some embodiments.

FIG. 8 is a flow diagram of a method for monitoring policy compliance, according to some embodiments. In this example, one or more trackable objects are established (801). For example, a trackable object may include personnel or materiel. In some embodiment, objects that have the potential for being stolen, such as ambulatory or portable equipment, may be tracked. In some embodiments, attributes of the object(s) may be determined and associated with the object IDs, for example the weight of the object, the type of the object, or the nature of the object.

One or more policy related logical locations may be established (802). For example, in a nuclear power plant, there may be a compliance policy relating to personnel being with a fixed distance of the radioactive core, such as 100 feet, and that region may be defined as a policy related logical location. As another example, in a munitions plant, there may be areas near high explosives, for example within a storage room, where untrained personnel are only permitted when accompanied by trained personnel, and that room may be established as a policy related logical location. As another example, in a financial institution, there may be an area such as a vault, with valuable items such as cash, and a policy that specifies that only some persons are permitted in that area alone, and a region including that vault may be defined as a policy related logical location. As another example, in a retail store, a set of non-overlapping policy related logical locations may include being in a location where retail sales are consummated, being otherwise inside the store, passing through an anti-theft portal at an exit from a store, or being outside the store, or otherwise untrackable.

In some embodiments, a policy related logical location definition may include specifications of time bounds. For example a manager may be allowed alone in a vault, but only during the hours of 9 am and 5 pm, and such a time interval may be incorporated into a definition of a policy related logical location.

Compliance with a policy may be determined (803). In some embodiments, a policy may preclude removal of an object from a defined logical location and location information for such an object outside of a defined logical location may imply a policy violation. An example of such a violation is the theft or unauthorized use of an inventoried object. Examples of an inventoried object include an object for sale or display in a retail environment, an object stored in a warehouse or distribution center, and an object stored in a secure location such as a vault. In some embodiments, absence of location information may be used as a determination of a policy violation. For example, if an inventoried object is placed within a shielded container, such as a foil coated bag, and communication of expected location information is not received, for example because RFID transmissions are blocked, then that may be a violation of a policy. In some embodiments, a policy may specify that objects move from one logical location to another logical location via a specific route. For example, the transitioning of an object from inside a store to outside a store, without passing through a logical location where a retail sale may is consummated, may be a violation of policy. In some embodiments, policies may include time limitations, such as hours of acceptable use and/or hours of acceptable placement inside or outside a logical location or hours of acceptable transit between logical locations.

As an example of a part of compliance determination, the locations of one or more trackable objects, and their duration and paths, may be computed and analyzed and/or summarized. In some embodiments, analysis of location information may include the determination of the total number of tracked objects in a logical location, or total number in a category of object in a given location, such as discussed in conjunction with 1109 of FIG. 11. Examples of categories include authorized objects, and non-authorized objects. Examples of techniques for such analysis are discussed in conjunction with FIGS. 10 and 11.

In some embodiments, analysis may include determination of a number of times an object entered one or more logical locations. In some embodiments, analysis may include determination of the speed of an object, or the direction of travel of an object. For example, speed and/or direction may be computed by comparing, for a single object, two or more location reports for that object. In some embodiments, summarized, derived or raw location information may be compared with a policy to determine compliance, for example: the presence of more objects in a logical location than prescribed by a policy; a speed of an object exceeding a policy; duration in a logical location exceeding a policy; absence of supervisory objects from a logical location while otherwise unauthorized or untrained objects are present in a logical location in violation of policy; or an absence of an object, such as a fire extinguisher or a guard, from a logical location in violation of policy.

A limited logical location refers herein to any logical location with which a capacity limit policy is associated. For example, a limited logical location may include a surface with a known limit associated with it. Examples of analysis of policy compliance in a limited logical location are discussed in conjunction with FIGS. 10 and 11. In some embodiments, other capacity tests may analogously be evaluated for compliance. For example, capacity limits may include restrictions on allowable scuba dives (for example as determined by a PADI scuba table), airplane motion allowed before scheduled maintenance is required, etc.

In some embodiments, tracking data may be used to monitor and/or audit periods of time that an object has been in a logical location, including exposure to a potentially hazardous environment, and/or to warn when policy prescribed limits, such as exposure limits, are reached or close to being reached. For example, a human's exposure to hazardous chemicals may be limited by a policy to a certain number of hours per week, or a certain number of continuous hours.

In some embodiments, tracking data may be used to monitor and/or audit capacity limits, for example by ensuring that no more than a certain number of people are within a confined space at once, or that equipment weighing no more than a certain amount is placed on a surface with known supporting strength limitations. For example, a tracked object may be associated with a known or estimated weight, aggregate weight in a logical location may be determined, and a warning provided when a policy limit is exceeded.

In some embodiments, a policy violation may consist of at least a prescribed number of trackable objects, such as 5, moving in an undesirable manner between logical locations, for example from "in store" to "untrackable," within a period of time, such as within 30 seconds. For example, component policy violations, such as movement in an undesirable manner, may be recorded, and each such recording may trigger a review to see if a threshold number of similar violations were recorded recently, such as within 30 seconds in the above example. In this example, a sufficient number of recent component policy violations may establish a full policy violation.

One or more non-compliance notifications may be provided (804). For example, a LAD instigating a policy violation may manifest a warning, such as a visual, auditory or vibratory signal. Examples of such policy violations include entry into restricted policy related logical location, or unauthorized exit from a policy related logical location, for example during an apparent theft of an object.

As another example, when a policy prescribed duration in a defined logical location is exceeded or approached, for example representing a duration of exposure to a hazardous substance, a warning may be manifested, for example directly to a person at risk and/or to a supervisor or safety auditor.

In some embodiments, a central location may be notified when a policy violation takes place, such as an unauthorized LAD entering a restricted area, which may manifest a warning at the central location or at another location, for example by sounding an alarm or notifying a supervisor or safety auditor. As another example, a violation of a policy that precludes removal of an object from a logical location may trigger a real-time alert. Such an alert may include an audible alarm, and/or a message transmission to a security group or police.

In some embodiments, a notification of a policy violation may include one or more descriptions of other tracked objects, such as people, that are in the proximity of an object that has induced a policy violation, or that correlate with recent locations of an object that produced a policy violation. For example, cameras may be passively tracking customers in a store when the logical location of a store product changes and induces a policy violation, for example by changing from "in store" to "unknown location," due potentially to shielding or destruction of the product's LAD. In that example, people that are in locations near the last known location of the product may be identified, for example by providing video replays or extracted still images from replays An audit trail may be provided (805). Examples of an audit trail may include records of some or all of the raw or derived location information. Examples of derived location information include the result of any analysis of location information, such as the list of defined logical locations that an object was in at one or more points in time, or the number of objects or aggregate weight for objects in a logical location at one or more points in time. Examples of methods for constructing such derived data are discussed in conjunction with FIGS. 10 and 11. In some embodiments, records may be stored in a log. In some embodiments, records may be stored in a database. In some embodiments, non-compliance events may be stored separately and/or flagged. In some embodiments, analysis showing compliance may be recorded, for example a record of tallies as a function of time showing compliance with a limited logical location related policy.

Figure 9:
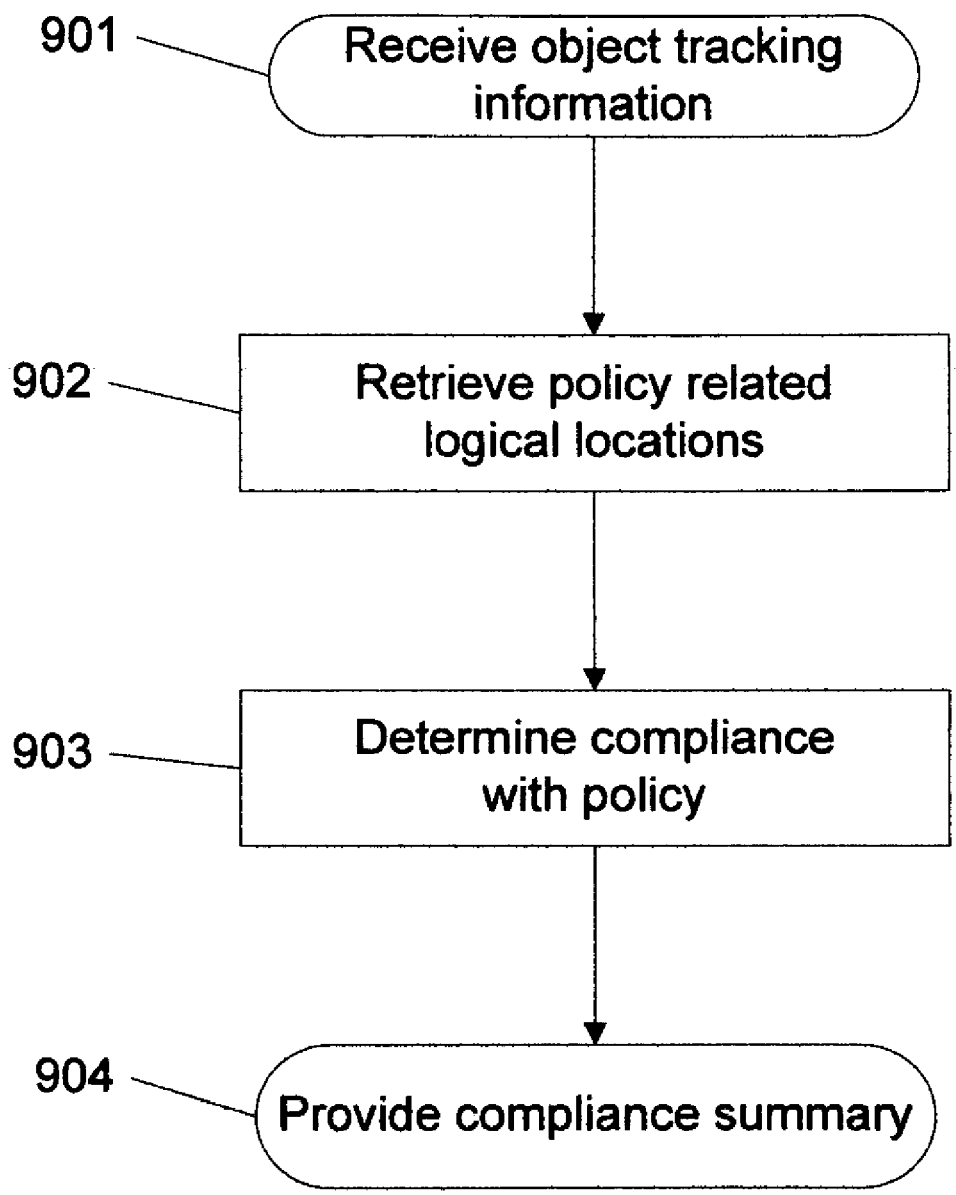
FIG. 9 is a flow diagram of a method for auditing compliance, according to some embodiments.

FIG. 9 is a flow diagram of a method for auditing compliance, according to some embodiments. In this example, object tracking information is received (901). Examples of received data include extractions from a database or a log file, such as discussed in conjunction with 303 and 805 of FIGS. 3 and 8 respectively.

Definitions of one or more logical locations related to a policy may be retrieved (902). For example, a list of one or more logical location definitions and applicable times may be retrieved. Examples of definitions of policy related logical locations are discussed in conjunction with 802 of FIG. 8.

Compliance with a policy may be determined (903). For example, tracking data may be used to demonstrate that a limited logical location never exceeded its rated capacity, or to identify when and how such a policy was violated. Examples of techniques for performing such compliance analysis are discussed in conjunction with FIG. 10.

Figure 10:
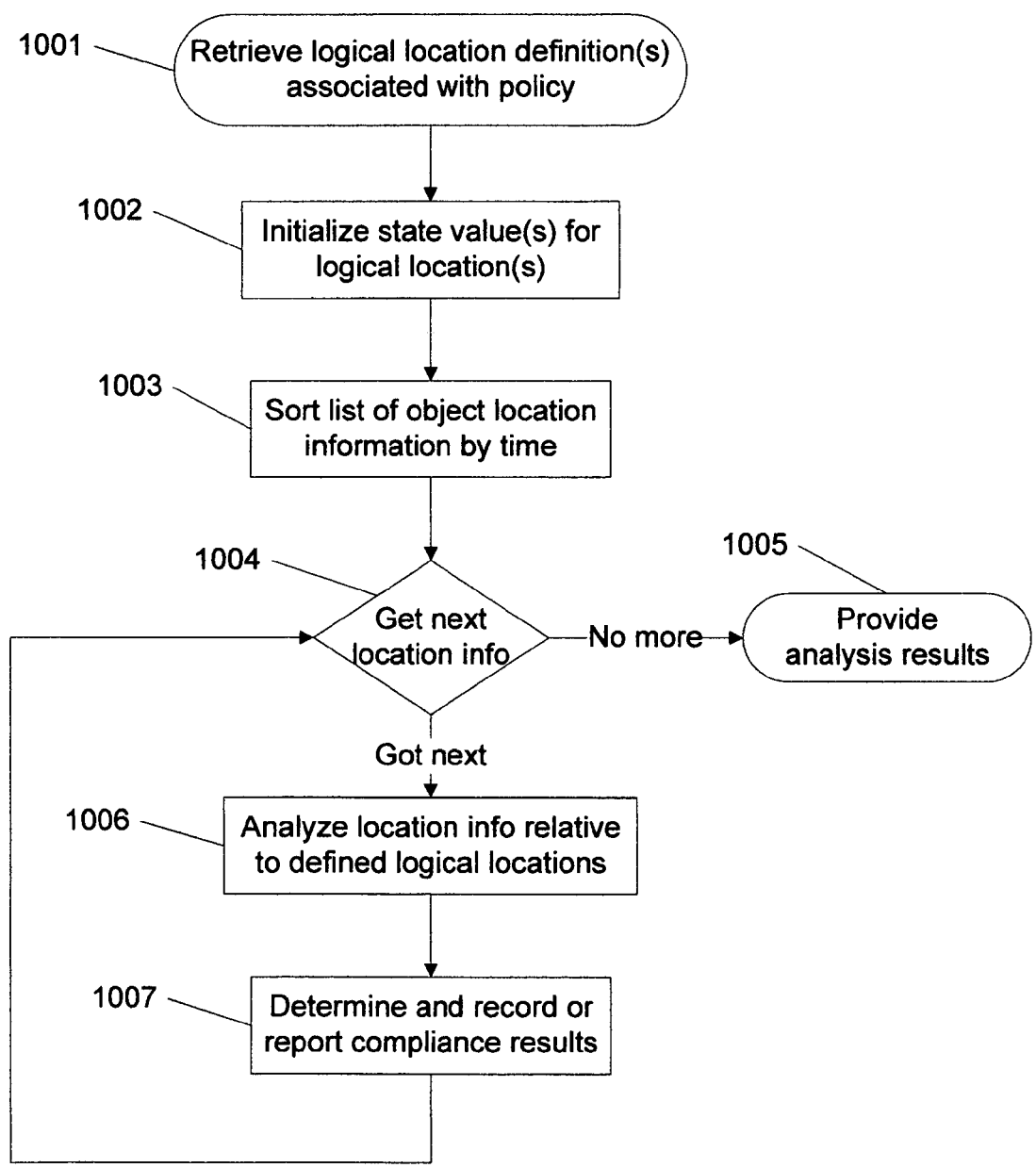
FIG. 10 is a flow diagram of a method for analyzing location information and/or policy compliance, according to some embodiments.

FIG. 10 is a flow diagram of a method for analyzing location information and/or policy compliance, according to some embodiments. In this example, one or more logical location definitions associated with a policy may be retrieved (1001). An example of retrieving logical location definitions is to retrieve a list of one or more logical location definitions, or references to logical location definitions which may then be separately retrieved, for example from a database. In some embodiments, this technique may be used to enforce a policy for limited logical locations that restricts some aggregate value(s) associated with defined logical location(s).

One or more state values associated with defined logical location(s) may be created or retrieved (1002). An example of state values corresponding to logical locations is an array of state values, indexed by an ordering over the logical locations, or by references associated with the logical locations. State values may be initialized. For example, state values may be initialized such that for each logical location enumerated, a measure or state value may be stored, such as the number of objects in the corresponding defined logical location, or the aggregate weight of such objects, etc. In some embodiments, state values may be initialized to values provided by earlier analysis. In some embodiments, state values may be initialized to predetermined values, such as zero in each element. In some embodiments, a survey of objects may be used to establish initial values. For example, if capacity is used at the beginning of an audit period, a set of state values associated with a policy may be initialized with a single entry showing the starting time and an initial load against capacity, such as weight, or with a separate entry for each object counting against the capacity at the beginning of an audit period.

A list containing object location information may be optionally sorted by time (1003). In some embodiments, location information for objects is provided in real time, sorted by time, and no sorting is performed. In some embodiments, location information may be retrieved from a log or database, and sorting may be used to order that retrieval.

If additional location information is available (1004) then in this example the location information is analyzed for compliance relative to the policy and/or logical location definitions (1006). For example, techniques discussed in conjunction with FIG. 11 may be used to review compliance within each defined logical location.

Compliance results may optionally be recorded or reported (1007). For example, a list of compliance issues, such as compliance violations, may be accumulated in a database or log. In some embodiments, real time notification of non-compliance may be performed, for example as discussed in conjunction with 804 of FIG. 8. In some embodiments, audit trails with analysis summaries may be recorded, for example as discussed in conjunction with 805 of FIG. 8.

It may be determined whether additional location information is available (1004). If additional location information is not available (1004), then analysis results are provided (1005) in this example. For example, recorded summaries of compliance and/or non-compliance may be provided, or an array of state values may be provided.

FIG. 11 is a flow diagram of a method for analyzing location information, according to some embodiments. In this example, location information is received (1101). For example, location information may include a location, a time, and specification of an object, such as an object identifier. In some embodiments, logical location state information, such as an array, may be supplied with the location information, containing aggregate information about one or more other objects in one or more defined logical locations, for example as discussed in conjunction with 1002 of FIG. 10.

It may be determined whether the located object is to be categorized as significant. Examples of significance include significance to the analysis, or significance to a policy being analyzed for compliance. In some embodiments, determination of significance may include analyzing a category associated with the located object. For example, if a policy restricts personnel in an area, and location information relating to materiel is provided, then the location information may be ignored, and no change in compliance reported. If the located object is not determined to be significant (1102), then compliance and/or analysis results are provided (1106), in this example.

If the located object is determined to be significant (1102), then one or more logical location definitions are retrieved (1104), in this example. For example, a list of logical location definitions relating to a policy or the analysis may be retrieved for sequential consideration.

If there is another logical location definition to evaluate (1105), then the located object's previous status relative to that defined logical location is retrieved (1107), in this example. For example, if the previously reported location of the located object was inside the defined logical location, or outside the defined logical location, than that fact may be recalled. In some embodiments, the previous reported location may be recalled, and contrasted with the defined logical location, to determine if the previous report was inside or outside the logical location. In some embodiments, if a previous location for an object is not available or not used, the object may be considered to have previously been outside the defined logical location.

If the previous and current reports of locations for the object relative to the defined logical location show that there was no entry or exit by that object (1108), then the next logical location definition is examined (1105), in this example. For example, if both previous and current locations were within the defined logical location, or were both outside that defined logical location, then there was no entry or exit.

If it is determined that an entry or exit was made relative to the defined logical location (1108), then logical location state is updated (1109), in this example. For example, logical location state may be created and/or maintained as discussed in conjunction with 1002 of FIG. 10. Updates include changes to the state for the logical location corresponding to the defined logical location being analyzed. Examples of updates of state include an adjustment to a value, such as adding an adjustment to the value when an entry is identified, and deducting an adjustment from the value when an exit is identified. Examples of such adjustments include the weight of the located object, an amount corresponding with the object, or a fixed amount, such as 1. In some embodiments, the state information may contain more than one value for each defined logical location, for example values for multiple categories of objects such as the number of supervisory persons in a logical location, and the number of pieces of equipment in that logical location. In such an example, personnel entering or exiting may adjust the personnel count by adding or subtracting 1 respectively, and equipment entering or exiting may adjust the equipment count by adding or subtracting 1 respectively.

Compliance results may optionally be determined and recorded or reported (1110). In some embodiments, compliance results may be determined by evaluating state information associated with one or more limited logical locations relative to policy restrictions. For example, if the policy, such as a limited logical location policy, restricts the total weight in a defined logical location, then state information corresponding to the weight in that location may be compared to a policy threshold to determine compliance. As a second example, if a policy forbids the presence of unauthorized personnel in a location without supervisory personnel, then whenever the count of unauthorized persons exceeds zero in the location and a count of supervisory personnel is zero, a record or report of non-compliance may be made.

It may be determined whether there is another logical location definition. If there are no more logical location definitions (1105), then analysis results are provided in this example (1106). For example, compliance results may be provided. As a second example, analysis results, such as a list of zero or more logical locations containing the located object, may be provided.

Figure 12:
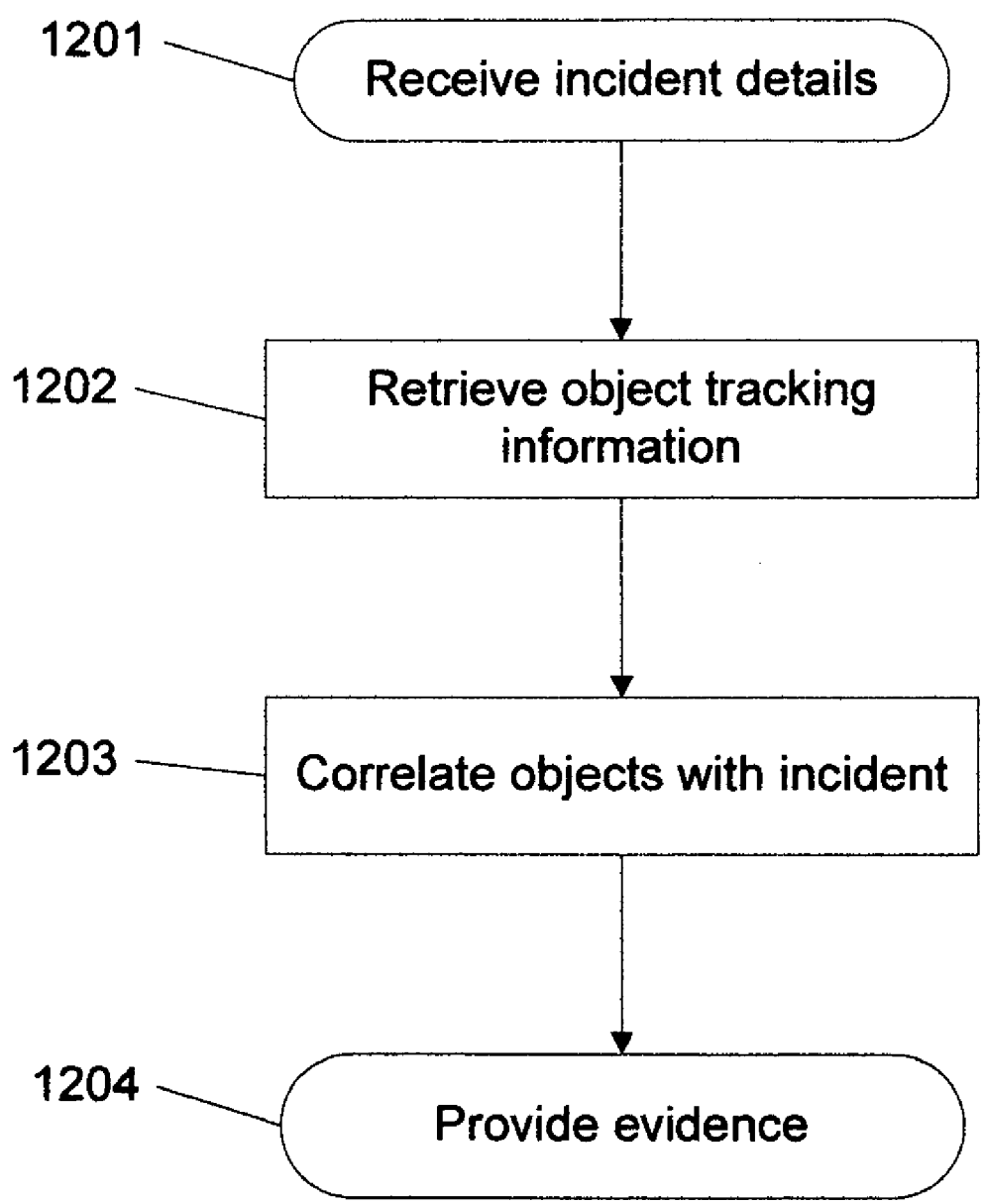
FIG. 12 is a flow diagram of a method for extracting liability evidence from tracking data, according to some embodiments.

FIG. 12 is a flow diagram of a method for extracting liability evidence from tracking data, according to some embodiments. In this example, details of an incident are received (1201). An example of an incident is an accident, and details may include the time and location of the accident.

Object tracking information may be retrieved (1202). Examples of retrieved data may include extractions from a database or a log file, such as discussed in conjunction with 303 or 805 of FIGS. 3 and 8 respectively. In this example, tracked objects may include personnel or equipment that may plausibly be involved in the incident.

One or more tracked objects may be correlated with the incident (1203). For example, if the incident was damage caused by a falling object at a specific location and time, then tracked objects, such as a crane or a steel beam, may be correlated with the incident to see if they were near the logical or physical location of the incident.

Evidence may be provided (1204). For example, location information that demonstrates that a tracked object was not spatially or temporally near an incident may be provided, or evidence that a tracked object was near an incident may be provided. In some embodiments, evidence that one or more objects' activity were inside or outside safe limits may be provided. Examples of safe limits may include restrictions on speed, direction, or orientation of an object, in absolute terms, or relative to other objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for location-based services, comprising:
at a microprocessor, receiving a first report at a first time from at least one of location sensing hardware in a mobile phone and location receiving hardware in the mobile phone, wherein the first report is associated with a first location and the mobile phone;
receiving a second report at a second time, wherein the second report is associated with a second location and the mobile phone;
determining that the first location corresponds to a facility, wherein the facility is one of a plurality of facilities about which information relating to said facilities are maintained;
determining that the first report is associated with entering the facility;
updating state information associated with the facility, wherein the modified state information includes an indication of presence of personnel associated with the mobile phone at the facility;
determining that the second report is associated with exiting the facility;
storing a data record including first data that includes a first identifier for the facility, second data that includes a second identifier for at least one of the mobile phone and the personnel associated with the mobile phone, and third data that includes information relating to the first time and the second time; and
executing programmatic instructions to determine an amount of time during which the mobile phone was associated with the facility based at least in part on the third data of the stored data record, wherein the amount of time during which the mobile phone was associated with the facility is to be used in calculating a charge on an invoice to a client, wherein the facility is associated with the client, wherein the charge to the client relates to a service performed by the personnel associated with the mobile phone, and wherein the charge to the client is calculated based at least in part on multiplying the amount of time during which the mobile phone was associated with the facility by a rate for the personnel associated with the mobile phone over a predetermined period of time.

2. The method of claim 1, wherein the location sensing hardware in the mobile phone includes a GPS receiver.

3. The method of claim 1, wherein determining that the first report is associated with entering the facility includes determining that the first location is associated with the facility and determining that a previous location is not associated with the facility.

4. The method of claim 1, wherein determining that the second report is associated with exiting the facility includes determining that the second location is not associated with the facility and determining that a previous location is associated with the facility.

5. The method of claim 1, wherein the rate for the personnel associated with the mobile phone over a predetermined period of time is an hourly rate.

6. The method of claim 1, further comprising preparing the invoice.

7. The method of claim 6, wherein the invoice is electronic.

8. The method of claim 6, wherein the invoice is printed.

9. The method of claim 1, wherein the facility is associated with a region defined by a plurality of corner points.

10. The method of claim 1, wherein the facility is a building.

11. The method of claim 1, wherein the facility is a campus.

12. The method of claim 1, wherein determining the amount of time during which the mobile phone was associated with the facility includes subtracting the first time from the second time.

13. The method of claim 1, wherein the facility is a room.

14. The method of claim 1, further comprising determining that at least one of the first time and the second time matches a time specification.

15. The method of claim 1, wherein the information relating to the first time and the second time includes the first time and the second time.

16. The method of claim 1, wherein the information relating to the first time and the second time includes a duration of time.

17. A system for location-based services, comprising:
a processor configured to:
receive a first report at a first time from at least one of location sensing hardware in a mobile phone and location receiving hardware in the mobile phone, wherein the first report is associated with a first location and the mobile phone;
receive a second report at a second time, wherein the second report is associated with a second location and the mobile phone;
determine that the first location corresponds to a facility, wherein the facility is one of a plurality of facilities about which information relating to said facilities are maintained;
determine that the first report is associated with entering the facility;
update state information associated with the facility, wherein the modified state information includes an indication of presence of personnel associated with the mobile phone at the facility;
determine that the second report is associated with exiting the facility;
store a data record including first data that includes a first identifier for the facility, second data that includes a second identifier for at least one of the mobile phone and the personnel associated with the mobile phone, and third data that includes information relating to the first time and the second time; and
execute programmatic instructions to determine an amount of time during which the mobile phone was associated with the facility based at least in part on the third data of the stored data record, wherein the amount of time during which the mobile phone was associated with the facility is to be used in calculating a charge on an invoice to a client, wherein the facility is associated with the client, wherein the charge to the client relates to a service performed by the personnel associated with the mobile phone, and wherein the charge to the client is calculated based at least in part on multiplying the amount of time during which the mobile phone was associated with the facility by a rate for the personnel associated with the mobile phone over a predetermined period of time; and
a memory coupled with the processor, wherein the memory provides instructions to the processor.

18. The system of claim 17, further comprising preparing the invoice.

19. The system of claim 18, wherein the invoice is electronic.

20. The system of claim 18, wherein the invoice is printed.

21. The system of claim 17, wherein the facility is associated with a region defined by a plurality of corner points.

22. The system of claim 17, wherein the facility is a building.

23. The system of claim 17, wherein the location sensing hardware in the mobile phone includes a GPS receiver.

24. The system of claim 17, wherein determining that the first report is associated with entering the facility includes determining that the first location is associated with the facility and determining that a previous location is not associated with the facility.

25. The system of claim 17, wherein determining that the second report is associated with exiting the facility includes determining that the second location is not associated with the facility and determining that a previous location is associated with the facility.

26. The system of claim 17, wherein the rate for the personnel associated with the mobile phone over a predetermined period of time is an hourly rate.

27. The system of claim 17, wherein the facility is a campus.

28. The system of claim 17, wherein determining the amount of time during which the mobile phone was associated with the facility includes subtracting the first time from the second time.

29. The system of claim 17, wherein the facility is a room.

30. The system of claim 17, wherein the processor is further configured to determine that at least one of the first time and the second time matches a time specification.

31. The system of claim 17, wherein the information relating to the first time and the second time includes the first time and the second time.

32. The system of claim 17, wherein the information relating to the first time and the second time includes a duration of time.

33. A computer program product for location-based services, the computer program product being embodied in a non-transitory computer readable storage medium and comprising computer instructions for:
at a microprocessor, receiving a first report at a first time from at least one of location sensing hardware in a mobile phone and location receiving hardware in the mobile phone, wherein the first report is associated with a first location and the mobile phone;

receiving a second report at a second time, wherein the second report is associated with a second location and the mobile phone;

determining that the first location corresponds to a facility, wherein the facility is one of a plurality of facilities about which information relating to said facilities are maintained;

determining that the first report is associated with entering the facility;

updating state information associated with the facility, wherein the modified state information includes an indication of presence of personnel associated with the mobile phone at the facility;

determining that the second report is associated with exiting the facility;

storing a data record including first data that includes a first identifier for the facility, second data that includes a second identifier for at least one of the mobile phone and the personnel associated with the mobile phone, and third data that includes information relating to the first time and the second time; and executing programmatic instructions to determine an amount of time during which the mobile phone was associated with the facility based at least in part on the third data of the stored data record, wherein the amount of time during which the mobile phone was associated with the facility is to be used in calculating a charge on an invoice to a client, wherein the facility is associated with the client, wherein the charge to the client relates to a service performed by the personnel associated with the mobile phone, and wherein the charge to the client is calculated based at least in part on multiplying the amount of time during which the mobile phone was associated with the facility by a rate for the personnel associated with the mobile phone over a predetermined period of time.

34. The computer program product of claim 33, wherein the computer program product further comprises computer instructions for preparing the invoice.

35. The computer program product of claim 34, wherein the invoice is electronic.

36. The computer program product of claim 34, wherein the invoice is printed.

37. The computer program product of claim 33, wherein the facility is a building.

38. The computer program product of claim 33, wherein the location sensing hardware in the mobile phone includes a GPS receiver.

39. The computer program product of claim 33, wherein determining that the first report is associated with entering the facility includes determining that the first location is associated with the facility and determining that a previous location is not associated with the facility.

40. The computer program product of claim 33, wherein determining that the second report is associated with exiting the facility includes determining that the second location is not associated with the facility and determining that a previous location is associated with the facility.

41. The computer program product of claim 33, wherein the rate for the personnel associated with the mobile phone over a predetermined period of time is an hourly rate.

42. The computer program product of claim 33, wherein the facility is associated with a region defined by a plurality of corner points.

43. The computer program product of claim 33, wherein the facility is a campus.

44. The computer program product of claim 33, wherein determining the amount of time during which the mobile phone was associated with the facility includes subtracting the first time from the second time.

45. The computer program product of claim 33, wherein the facility is a room.

46. The computer program product of claim 33, further comprising computer instructions for determining that at least one of the first time and the second time matches a time specification.

47. The computer program product of claim 33, wherein the information relating to the first time and the second time includes the first time and the second time.

48. The computer program product of claim 33, wherein the information relating to the first time and the second time includes a duration of time.

* * * * *